June 11, 1940.  A. F. MOYER  2,204,254
POWER MOWER
Filed Jan. 6, 1938  4 Sheets-Sheet 1

Inventor
AMOS F. MOYER
By Paul, Paul & Moore
ATTORNEYS

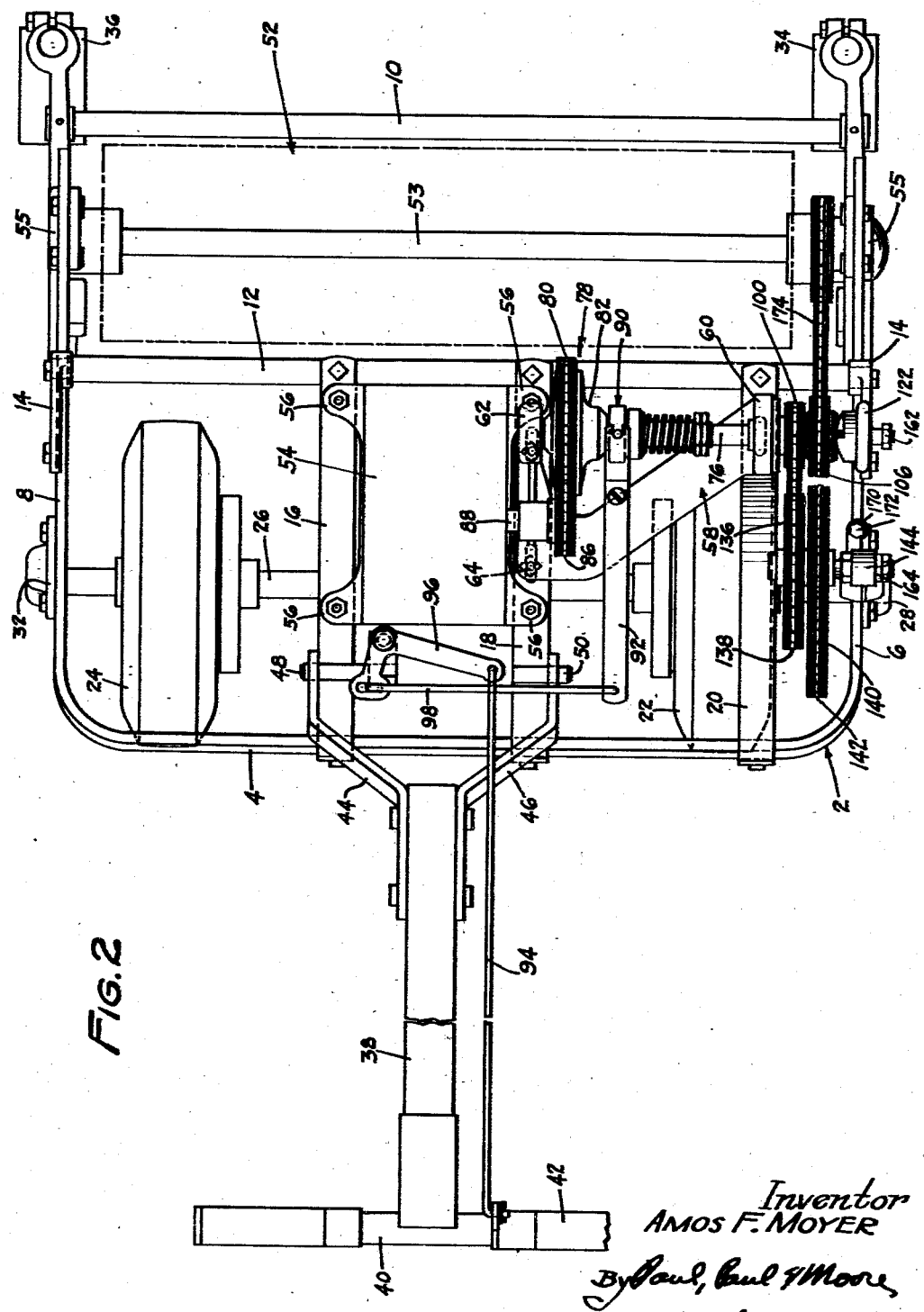

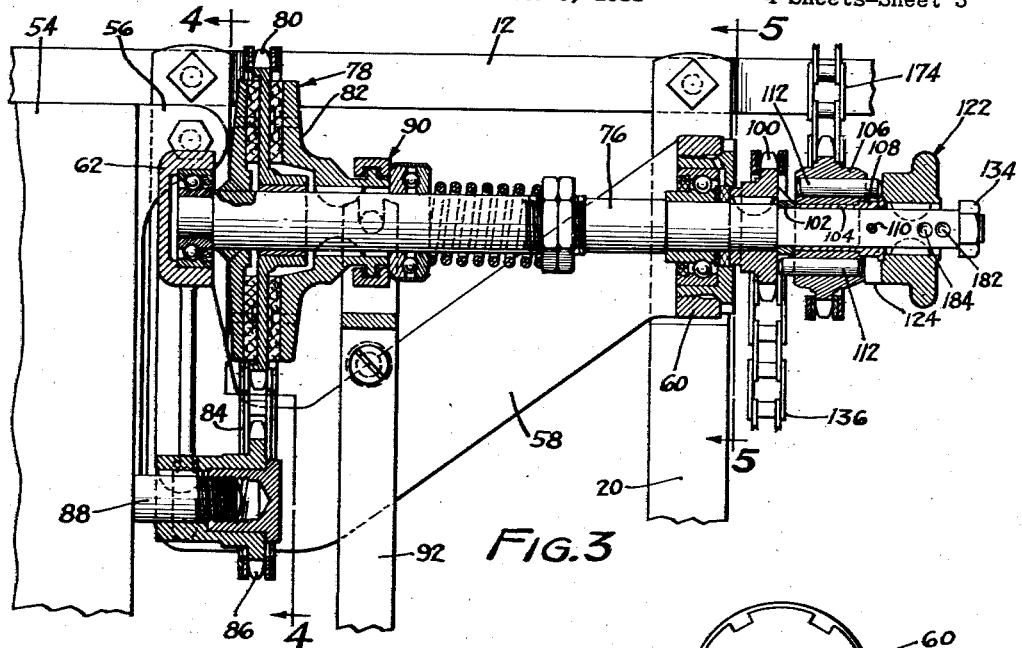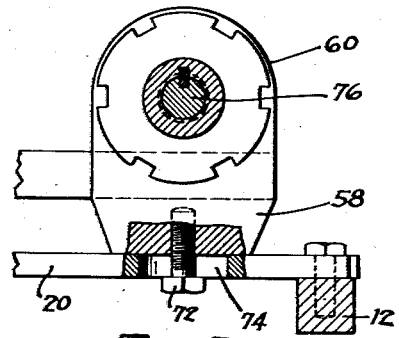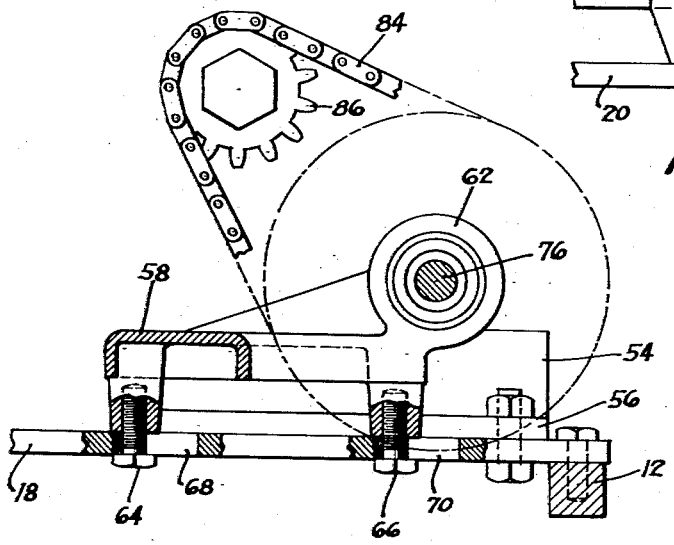

June 11, 1940.  A. F. MOYER  2,204,254
POWER MOWER
Filed Jan. 6, 1938  4 Sheets-Sheet 4
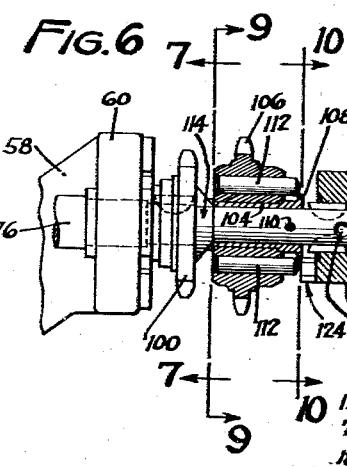
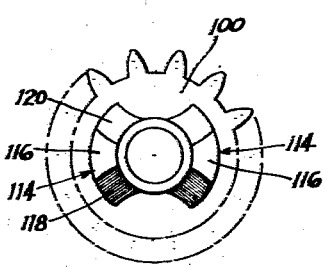
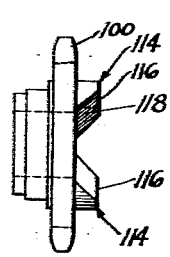
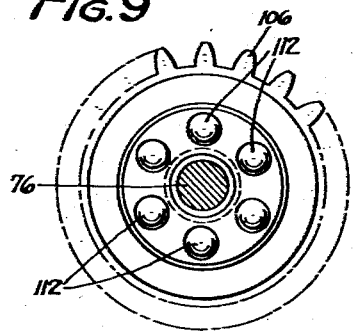
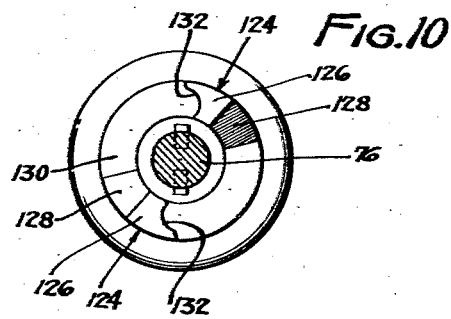
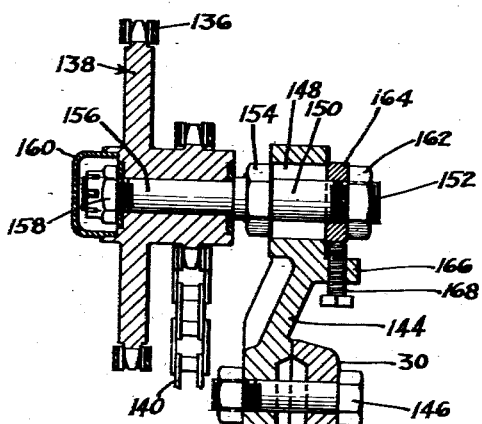
Inventor
AMOS F. MOYER
ATTORNEYS Patented June 11, 1940

2,204,254

UNITED STATES PATENT OFFICE 2,204,254

POWER MOWER

Amos F. Moyer, Minneapolis, Minn., assignor to Toro Manufacturing Corporation of Minnesota, Minneapolis, Minn., a corporation of Minnesota Application January 6, 1938, Serial No. 183,672

14 Claims. (Cl. 56—25)

This invention relates to power lawn mowers and has for its principal object the provision of a simple and efficient transmission which will readily permit reversal of the direction of travel of the mower without reversing the cutter. A further and more specific object of the invention is the provision of an improved arrangement facilitating adjustment of the chains of chain driving means for the mower and propelling wheels. These and other objects of the invention will become more readily apparent upon a detailed study of the accompanying drawings and specification, together with the appended claims.

The invention is especially adaptable to power lawn mowers of the type commonly controlled by an operator who walks behind and guides the mower by the handles and who maneuvers the mower in reverse direction when required, by pulling it backward, even though power means are provided in the mower for propelling it forward while driving the cutter. The invention is also applicable in mowing machines of larger sizes that might be provided with power means for propelling in reverse.

In power lawn mowers of the above type, a friction clutch is commonly employed to engage or disengage the motor to or from the transmission system, for starting or stopping. With the simpler transmission systems, but one clutch is employed, and power is transmitted therefrom both at relatively high speed to the cutter, and also at relatively low speed to the propelling wheels.

In mowing confined or partially obstructed areas, the mower must be frequently stopped and pulled backward, which is permitted by releasing the clutch. Prior to this invention, the propelling wheels and cutters of power mowers provided with single clutches were connected by a transmission system whereby the backward rolling of the mower was necessarily accompanied by a reverse motion of the cutter. Because of the relatively high speed of the cutter, and pressure frequently present between the contacting edges of the knives, the frictional resistance to rolling backward in such mowers is very great, and excessive muscular effort required. Indeed, the friction is often so great that the propelling wheels become locked and will slip instead of rolling backward, with consequent damage to the turf.

In accordance with the present invention, a mower of this type is provided which has power transmitting means of such nature that no power is transmitted from the wheels to the cutter when the mower is moved backwards and the rotation of the wheels is reversed. In the mower herein shown and specifically described, the transmission is divided into two systems, one of which is continuously connected with the clutch and operates the propelling wheels, and the other of which is driven by the first and serves to operate the cutter. To secure the desired result, a ratchet device operative to drive the cutter forwardly but which permits reverse motion of the propelling system without operating the cutter, is placed in the cutter driving system. This permits the mower to be rolled backward with great ease while the friction clutch is released, independently of tightness between the cutter knives.

While any desired type of ratchet mechanism may be employed, it is a further object of this invention to provide an improved type of ratchet mechanism for this purpose. The particular type of ratchet contemplated by this invention and herein described is simple, efficient and durable, as well as positively operative without springs, and independently of gravity. It is also disengageable, so that the mower can be propelled forwardly without operating the cutter. When engaged, the mower is instantly free to roll backward without reversing the cutter, upon release of the friction clutch.

In the drawings, which are merely illustrative of one embodiment of the invention, Figure 1 is a side elevation of a mower to which the invention has been applied;

Figure 2 is a plan view of the mower shown in Figure 1;

Figure 3 is a partial sectional view along line 3—3 of Figure 1 and showing in longitudinal section the arrangement of the clutch together with the positive drive for the propelling wheels and the ratchet drive for the cutter;

Figure 4 is a cross-section along line 4—4 of Figure 3;

Figure 5 is a sectional view along line 5—5 of Figure 3;

Figure 6 is a fragmentary detail view showing a longitudinal section of the ratchet mechanism with the knob out of engagement;

Figure 7 is a sectional view along line 7—7 of Figure 6 showing the sprocket for driving the propelling wheels;

Figure 8 is a side elevation of the sprocket shown in Figure 7 but with the sprocket rotated 90° from the position shown in Figure 7;

Figure 9 is a cross-sectional view along line 9—9 of Figure 6;

Figure 10 is a sectional view along line 10—10 of Figure 6;

Figure 11 is a sectional view along line 11—11 of Figure 1;

Figure 12 is a fragmentary sectional view showing a modified form of ratchet mechanism; and Figure 13 is a fragmentary cross-sectional view showing the detent for holding the knob in adjusted position.

Figure 1:
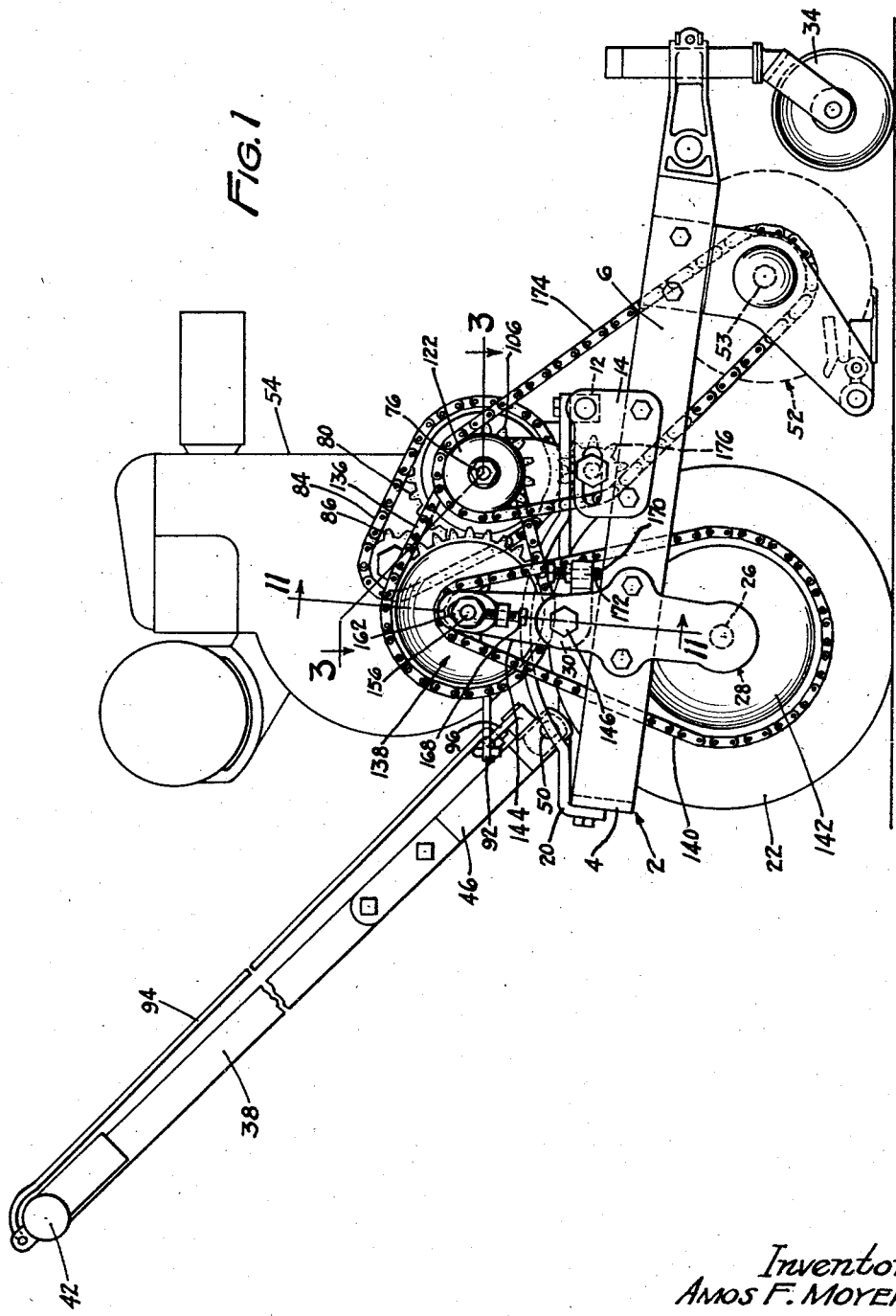

Referring more particularly to the drawings, numeral 2 designates generally a frame comprising a U-shaped member having a rear transverse portion 4 and side portions 6 and 8. At the front of the frame is a brace rod 10. A transverse supporting bar 12 is mounted on brackets 14 which are bolted to the side members 6 and 8. There are further provided spaced longitudinal supporting bars 16 and 18 each of which is bolted at one end to the rear transverse portion 4 of the U-shaped frame and to the transverse supporting bar 12. The frame further is provided with a longitudinal supporting bar 20 which is likewise bolted to the members 4 and 12 and which is formed with an arc at its center portion in order to clear a wheel as shown in Figure 1. The frame is provided with propelling wheels 22 and 24, having inflated tires and are thus of the type generally known as "air wheels." These wheels are mounted on a shaft 26 which extends from one side to the other of the frame. At one end the shaft is journaled in a bearing member generally designated at 28 which is bolted to the side member 6 of the frame and is further provided with an upwardly extending lug portion 30, as shown in Figures 1 and 11. The other end of shaft 26 is journaled in a bearing member 32 which is bolted to the side frame member 8. At the front of the frame there are suitable caster wheels 34 and 36. A handle for the frame generally designated at 38 has a top cross piece 40 provided with a rotatable grip 42. The lower portion of handle 38 has bolted thereto members 44 and 46 which are pivoted to pins 48 and 50 that are welded to the frame members 16 and 18. The handle is used to steer the mower and may also be used for the purpose of pulling the mower backward manually as will hereinafter be pointed out more particularly.

Numeral 52 designates generally a cutting reel which is mounted between the side members 6 and 8 in the forward portion of the frame. The reel is mounted on a shaft 53 which is journaled in similar bearing and cutter bar supports 55 which are bolted to the forward portions of the side members 6 and 8. A motor is provided for driving the cutting reel 52 and also driving the propelling wheels. In this case there is shown a gasoline engine 54 which is mounted upon and bolted to the longitudinal supporting bars 16 and 18 by means of bolts passing through the lugs 56. Numeral 58 designates a main bracket which carries both of the clutch shaft bearings 60 and 62. The bracket is mounted on the supporting bars 18 and 20 by means of suitable bolts and is longitudinally adjustable on these bars by reason of the fact that the connecting bolts pass through longitudinal slots in the bars 18 and 20. As shown in Figure 4, the bracket is connected to supporting bar 18 by means of bolts 64 and 66 passing through longitudinal slots 68 and 70 in the bar 18. And as shown in Figure 5, the bracket 58 is connected to supporting bar 20 by means of a bolt 72 passing through the longitudinal slot 74.

Mounted in the clutch bearings 60 and 62 is clutch shaft 76 having an end portion of reduced diameter extending beyond bearing 60 to the right as viewed in Figure 3. Any desired type of clutch mechanism, preferably a friction clutch, is mounted on the shaft 76. As here shown there is a friction clutch generally designated at 78 having a sprocket member 80 rotatably mounted on the shaft, and a member 82 keyed to the shaft but longitudinally movable thereon for movement into and out of engagement with the cooperating clutch elements. A chain 84 connects the sprocket member 80 of the clutch with the engine sprocket 86 which is keyed onto the engine crank shaft 88 whereby sprocket member 80 is in constant rotation while the engine is running. A clutch collar generally designated at 90 and operated by a pivoted clutch fork 92, is provided for engaging and disengaging clutch member 82. This fork is operated by manipulation of the rotatable grip 42 of the handle through link 94, bellcrank lever 96, and link 98 which is connected to the free end of the fork 92, as clearly illustrated in Figure 2.

A propelling wheel drive sprocket 100 is keyed onto the shaft 76 on the right-hand side of bearing 60, as viewed in Figure 3, and is held against movement longitudinally of the shaft by virtue of abutment against the bearing 60 on one side and abutment against a spacing collar 102 on the other side, which in turn abuts against a sleeve 104 and retains ratchet sprocket member 106. The sleeve 104 is integral with a flanged collar 108 which is secured to the shaft against both rotatable and longitudinal movement by a pin 110, thereby permitting rotation of sprocket member 106. It will be seen from the foregoing description that the bearing member 60 and the flanged collar 108 with sleeve 104 hold the propelling wheel driving sprocket 100, the spacing collar 102, and the ratchet sprocket member 106 against longitudinal movement on shaft 76. The ratchet sprocket member 106 is provided with a plurality of circumferentially arranged passageways extending longitudinally of the shaft 76. In each passageway there is mounted a freely slidable pin 112 having a length somewhat greater than the width of the ratchet sprocket member. As shown in Figures 3, 6, 7 and 8 the right-hand face of the propelling wheel drive sprocket 100 (as viewed in Figures 3 and 6) is provided with oppositely disposed cam members each generally designated at 114 and having a raised flat surface 116 which is parallel to the face of the sprocket, and inclined surfaces 118 and 120 leading away therefrom. These cam members 114 are located opposite the pin 112 of the ratchet sprocket member 106 for a purpose hereinafter to be described.

At the extreme right-hand end of the shaft 76 there is keyed thereto, but slidably mounted thereon, a slide member generally designated 122 and having a suitable gripping knob as shown. As shown more particularly in Figure 10, the left-hand face of this slide member (when viewed in Figure 3) has fixed thereto oppositely disposed ratchet claw members generally designated at 124, each of which has an upper flat surface 126 in a vertical plane and an inclined surface 128 leading to the face 130 of the slide member which is likewise in a vertical plane, as here shown. The members 124 are formed with arcuate surfaces 132 forming claws for engagement with the pins 112 of the ratchet sprocket member 106. A nut 134 on the end of shaft 76 prevents complete removal of the slide member 122 in normal manipulation. The arrangement is such that the cam members 114 on the propelling wheel driving sprocket 100 are positioned opposite the spaces between the members 124 of the knob 122.

The sprocket 100 which is fixed to the shaft 76 is connected to the propelling wheels for driving the same. This connection is made by means of a chain 136 which passes over sprocket 100 and the large sprocket member of a step sprocket 138. A chain 140 connects the small sprocket member of the step sprocket 138 with sprocket 142 which is secured to the shaft 26 for the propelling wheels 22 and 24. As shown in Figures 1 and 11, the step sprocket 138 is mounted on a swingable arm 144 which is secured to the upper portion 30 of the bearing supporting member 28 by means of a bolt 146. The swingable arm is provided with a substantially vertical slot 148 at its upper portion which receives a shaft member generally designated at 150 having a threaded end 152, a shoulder 154, a reduced portion 156 on which the step sprocket 138 is mounted and an oppositely threaded end receiving a nut 158 in a nut housing 160. The nut 162 for the threaded end 152 bears against a washer 164 located between the face of swingable arm 144 and nut 162. When nut 162 is tightened it will be seen that shaft members 150 will be rigidly secured to the swingable arm 144. The swingable arm is provided with an inintegral lug 166 having a threaded passageway receiving an adjusting screw 168 that bears against the washer 164. By loosening screw 162 and adjusting screw 168, the position of shaft member 156 with respect to the slot 148 may be varied and when the desired position is obtained the shaft member may be secured in such position by a tightening of nut 162. The swingable arm 144 is further formed (see Figure 1) with an integral lug or finger 170 having an adjusting screw 172 bearing against the top of the frame member 6. By loosening the nut for bolt 146 and manipulating the adjusting screw 172, the angular position of the swingable arm 144 may be adjusted and when the desired adjustment has been obtained, the nut for bolt 146 may be again tightened to secure the arm in adjusted position.

By reason of the structure above described, the main clutch shaft supporting bracket 58 is adjustable longitudinally of the frame by loosening the nuts on the bolts and permitting the bolts to slide in the slots of the supporting bars. Accordingly the engine drive chain 84 may be adjusted by adjusting the main bracket 58. This adjustment will affect the chain 136 and this chain should accordingly be slack when the engine driving chain is first adjusted. The slack in chain 136 may now be taken up by rotating the swingable arm rearwardly about its pivot 146 by manipulating of the adjusting screw 172, bolt 146 being tightened to lock the arm when it reaches adjusted position. The slack in the final drive chain 140 for the propelling wheels is then taken up by adjusting the screw 168 and the position of shaft member 156 in the slot 148. When proper adjustment has been made nut 162 is tightened to lock the shaft member 156 in proper position. These adjustments constitute all necessary adjustments in the transmission system connecting the engine crank shaft to the propelling wheel.

The cutting reel is driven from the ratchet sprocket member 106 by means of a chain 174. This chain is provided with an idler sprocket 176 which is adjustably mounted in a slot formed in the plate 14 for adjusting the tension in this chain. In order to adjust the slack in chain 174 for the cutting reel, the position of idler sprocket 176 is adjusted.

When the engine is operating and the clutch member 82 is moved to the right of the position shown in Figure 3, the clutch sprocket member 80 merely rotates on shaft 76 and there is no driving connection to this shaft. But when the clutch parts are in the position shown in Figure 3, power from the engine crank shaft is transmitted to shaft 76 and it rotates continuously. Inasmuch as the sprocket 100 for the propelling wheels is keyed onto the shaft 76, this likewise continuously rotates and power is continuously transmitted to the propelling wheels through the system of chains described above, with the result that the mower is propelled forwardly.

If the slide member 122 is in the inoperative position shown in Figure 6, i. e. away from ratchet sprocket member 106, there is no connection with this member or its associated ratchet claw members 124 and the pins of ratchet sprocket member 106, and there is accordingly no driving connection between shaft 76 and this member. In this position of the slide no power will be transmitted to the cutting reel upon propulsion of the mower in either direction, either by means of the engine or by hand, and the mower may be conveniently propelled from place to place without operating the cutter. Any of the pins 112 that may have been to the left of the position shown in Figure 6 will be moved into the direction of the slide member and into engagement with the flange of collar 108 by the cam members 114, upon relative rotation of the sprocket 100 and member 106. The flange on the collar 108 limits the movement of the pins to the right as viewed in Figures 3 and 6.

If it now be assumed that the operator wishes to have the cutter operate simultaneously with forward movement of the mower, the slide member 122 is adjusted by moving the same into its operative position shown in Figure 3 in which it is adjacent ratchet sprocket member 106. When moved into this position, the members 124 on the slide member will push some of the pins 112 into the spaces between the cam members 114 on the sprocket 100. Each of the claw portions 132 of the members 124 will engage one of the remaining pins, and when the members of clutch 78 are closed and power is transmitted to shaft 76, in forward propelling direction, ratchet sprocket member 106 and the knob 122 will rotate as a unit whereby power will be transmitted to the cutting reel.

The slide member 122 is selectively set and held in either its operative position adjacent to the ratchet sprocket member 106 in which the cam and claw members engage the pins 112, or in its inoperative position away from member 106 and its associated pins, by means of the spring pressed detent 180 which cooperates with either of the depressions 182 or 184 as will be evident from Figures 6 and 13.

If it should become necessary for the operator to roll the mower backward while the slide member 122 is set in operative position adjacent ratchet sprocket member 106, as shown in Figure 3, it is not necessary to adjust slide member 122 into the position shown in Figure 6, but it is only necessary to open the friction clutch 78 by means of the rotatable grip 42 on the handle and pull the mower backwards by means of the handle. This backward movement of the mower will of course result in reverse movement of the wheels 22 and 24. Such reverse movement will cause reverse movement in the chain driving system for the propelling wheels and of the clutch member 82. But this reverse movement will not be communicated to chain 174 of the cutting reel by reason of the ratchet arrangement above described. When the reverse movement of shaft 76 occurs, slide member 122 and sprocket 100 will rotate therewith inasmuch as they are keyed thereto. When this takes place, the claw portions 132 of members 124 will move away from the pins they were engaging during forward motion and the bevel or cam surfaces 128 on the members 124 will push the pins which they engage into the spaces between the cam members 114 of the sprocket 100. These pins will next be engaged by the cam members 114 which will push them back in the direction of the slide member into spaces between the claw and cam members 124. The result is a rapid reciprocation of the pins 112 from one side to the other of the member 106 but no power is communicated to member 106. In fact, memebr 106 may still be rotating in forward direction due to the inertia of the cutting reel when the shaft 76 begins rotating in reverse direction due to pulling the mower backward. When forward movement is resumed, the claws will each automatically engage one of the pins 112 and the cutting reel will again be driven.

It will be apparent from the foregoing description that any desired number of pins 112 may be employed and also any desired number of ratchet claw members 124 may be employed but preferably the number of pins is a multiple of the number of members 124. As here shown, the number of cam members 114 is equal to the number of members 124. As here also shown, the cam members 114 are mounted on the sprocket 100 for purposes of convenience but if desired they may of course be mounted on a separate member.

Figure 12 shows a modified construction of the ratchet sprocket member and its associated pins. In this case the pin passageways through the member 106' are of reduced diameter on the side adjacent to the slide member 122'. The pins 112' operating in these passageways are formed with ends of reduced diameter which fit into the portions of reduced diameter of the passageways. This shape of the pins and passageways prevents the pins from exceeding movement in the direction of the slide beyond that illustrated in the upper portion of Figure 12, thereby obviating the necessity for use of the flange on the collar 108 to limit the movement of the pins. However, a collar 108' is secured to the shaft 76' by means of a suitable pin to prevent sliding of the member 106' longitudinally of the shaft.

While the invention has herein been described as applicable to a mower which is reversed manually, it is equally applicable to mowers arranged to be reversed under power from the mower, as previously indicated.

Having now described my invention, what I claim as new and desire to secure by Letters Patent of the United States is as follows:

1. A transmission for a power mower comprising a support, a propelling wheel therefor, a cutter connected to the support, wheel drive means for transmitting power to the propelling wheel, and cutter drive means connecting the wheel drive means and the cutter for simultaneously operating the cutter from the wheel drive means, said cutter drive means including means to interrupt the transmission of power from the propelling wheel to the cutter when said propelling wheel is moved in the reverse direction.

2. A transmission for a power mower comprising a support, a propelling wheel therefor, a cutter connected to the support, and power transmission means connected to the wheel and cutter for simultaneously transmitting power to said wheel and cutter, said transmission means including means to interrupt the transmission of power from the propelling wheel to the cutter when the direction of travel of the propelling wheel is reversed.

3. A transmission for a power mower comprising a support, a propelling wheel therefor, a cutter connected to the support, a clutch, means for transmitting power to the clutch, wheel drive means for transmitting power from the clutch to the propelling wheel, and non-reversible cutter drive means connecting the wheel drive means and cutter for transmitting power from the wheel drive means to said cutter.

4. A transmission for a power mower comprising a support, a propelling wheel therefor, a cutter connected to the support, a clutch, means for transmitting power to the clutch, a system connecting the clutch and the propelling wheel for transmitting power therebetween, and a non-reversing power transmitting means connecting said system.

5. A transmission for a power mower comprising a frame, a propelling wheel therefor, a cutter mounted on the frame, a friction clutch, a first transmission system continuously connecting the clutch and propelling wheel, and a second transmission system connecting the first said system and the cutter, said second system including a ratchet device oriented in the system to ratchet when the propelling wheel is moved backwards.

6. A transmission for a power mower comprising a frame, a propelling wheel therefor, a cutter connected to the frame, a power driven clutch shaft journaled in bearings supported on the frame, a clutch mounted on the shaft, a driving connection between the shaft and propelling wheel, and driving connection between said shaft and said cutter, said driving connection including a one-way drive clutch oriented to transmit power only when the shaft is rotated in the direction corresponding to forward movement of the mower.

7. A transmission for a power mower comprising a frame, a propelling wheel therefor, a cutter connected to the frame, a shaft journaled in bearings supported on the frame, a power driven clutch mounted on the shaft, a system of sprockets and chains forming a driving connection between the shaft and propelling wheel, and a separate chain transmission system connecting said shaft and cutter, said separate system including a one-way drive ratchet mechanism oriented in the system to transmit power therethrough only in the direction corresponding to forward motion of the mower.

8. A transmission system including a shaft, a ratchet member rotatably mounted on the shaft but held against longitudinal movement and having a plurality of passageways therethrough longitudinally of the shaft, a pin in each of said passageways, a cam support spaced from said ratchet member and fixed on said shaft at one side of said member, a plurality of cam members carried by said support, a slide member keyed to the shaft against rotation with respect thereto on the opposite side of said ratchet member and movable into and away from an operative position adjacent said member, ratchet claws carried by said slide member having cam surfaces located opposite spaces between the aforesaid cam surfaces on the aforesaid cam supporting member, each of said ratchet claws engaging one of the pins of said ratchet member and causing said bearing support, ratchet member and slide to rotate with the shaft as a unit when the slide is positioned adjacent the ratchet member and the shaft is rotating in one direction, and the cams on said cam support and on said slide causing reciprocation of said pins in said ratchet member without transmission of power to said member when the slide is positioned adjacent the same and the shaft is rotating in reverse direction, and said slide and its associated ratchet claws being entirely free of said pins when the slide is positioned away from said ratchet mechanism, whereby no power is transmitted from the shaft to the ratchet member when the shaft is rotated in either direction while the slide is so positioned.

9. A transmission for a power mower comprising a frame, a propelling wheel therefor, a cutter mounted on the frame, a shaft journaled in bearings supported on the frame, a clutch mouted on the shaft and adapted to be connected to a source of power, a transmission system for transmitting power from the shaft to the propelling wheel, a ratchet member rotatably mounted on the shaft but held against longitudinal movement and having a plurality of passageways running therethrough longitudinally of the shaft, a pin in each of said passageways, a cam support spaced from said ratchet member and fixed on said shaft at one side of said member, a plurality of cam members carried by said support, a slide member keyed to the shaft against rotation with respect thereto on the opposite side of said ratchet member and movable into and away from an operative position adjacent said member, ratchet claws carried by said slide member having cam surfaces opposite spaces between the aforesaid cam surfaces on the aforesaid cam supporting member, and a transmission system connecting said ratchet member and cutter, each of said ratchet claws engaging one of the pins of said ratchet member and causing said bearing support, ratchet member and slide to rotate with the shaft as a unit when the slide is positioned adjacent the ratchet member and the shaft is rotating in one direction, and the cams on said cam support and on said slide member causing reciprocation of said pins in said ratchet member without transmission of power to said member when the slide is positioned adjacent the same and the shaft is rotating in reverse direction, and said slide and its associated ratchet claws being entirely free of said pins when the slide is positioned away from said ratchet member, whereby no power is transmitted from the shaft to the ratchet member when the shaft is rotated in either direction while the slide is so positioned.

10. A transmission for a power mower comprising a frame, a propelling wheel therefor, a cutter mounted on the frame, a bracket mounted on said frame and adjustable longitudinally thereof, clutch shaft bearings carried by said bracket, a clutch shaft journaled in said bearings, a clutch carried by said shaft, a drive sprocket, a chain connecting the same with said clutch, the slack in said chain being adjustable by a longitudinal adjustment of said bracket with respect to the frame, a sprocket fixed on said clutch shaft, a swingable arm pivotally mounted on said frame, a step sprocket rotatably mounted on said swingable arm, a chain connecting the large member of said step sprocket with the fixed sprocket on the clutch shaft, means for rotatably adjusting said swingable arm to adjust the slack in the last said chain, a sprocket for the propelling wheel, a chain connecting said sprocket with the small member of the aforesaid step sprocket, means for adjusting the position of said step sprocket longitudinally with respect to said swingable arm to adjust the slack in said last mentioned chain, a second sprocket member carried by said clutch shaft, a chain connecting said second sprocket member with said cutter, and an idler sprocket adjustably mounted with respect to said frame for adjusting the slack in said last mentioned chain.

11. A transmission for a power mower comprising a frame, a propelling wheel therefor, a cutter connected to the frame, a system of chains and sprockets mounted on the frame for conveying power to the propelling wheel and cutter, and means for adjusting the position of said sprockets with respect to said frame thereby to adjust the slack in said chains.

12. A transmission for a power mower comprising a frame, a propelling wheel therefor, a cutter mounted on the frame, a bracket mounted on said frame and adjustable longitudinally thereof, clutch shaft bearings carried by said bracket, a clutch shaft journaled in said bearings, a clutch carried by said shaft, a drive sprocket, a chain connecting the same with said clutch, the slack in said chain being adjustable by a longitudinal adjustment of said bracket with respect to said frame, a sprocket fixed on said clutch shaft, a swingable arm pivotally mounted on said frame, a step sprocket rotatably mounted on said swingable arm, a chain connecting the large member of said step sprocket with the fixed sprocket on the clutch shaft, means for rotatably adjusting said swingable arm to adjust the slack in the last said chain, a sprocket for the propelling wheel, a chain connecting said sprocket with the small member of the aforesaid step sprocket, means for adjusting the position of said step sprocket longitudinally with respect to said swingable arm to adjust the slack in said last mentioned chain, a ratchet sprocket member rotatably mounted on said clutch shaft but held against longitudinal movement and having a plurality of passageways running therethrough longitudinally of the shaft, a pin in each of said passageways, a cam support spaced from said ratchet sprocket member, and fixed on said shaft at one side of said member, a plurality of cam members carried by said support, a slide member keyed to the said clutch shaft against rotation with respect thereto on the opposite side of said ratchet sprocket member, and movable into and away from an operative position adjacent said member, ratchet claws carried by said slide member having cam surfaces opposite spaces between the aforesaid cam surfaces on the aforesaid cam supporting member, a chain connecting said ratchet sprocket member and said cover, and an idler sprocket adjustably supported by said frame for adjusting the slack in said last mentioned chain, each of said ratchet jaws engaging one of the pins of said ratchet member and causing said bearing support, ratchet sprocket member and slide to rotate with the shaft as a unit when the slide is in operative position adjacent the ratchet member and the shaft is rotating in one direction, and the cams on said cam support and those on said slide member causing reciprocation of the pins in said ratchet sprocket member without transmission of power to said member when the slide is in operative position adjacent the same and the shaft is rotating in reverse direction, and said slide and its associated ratchet jaws being entirely free of said pins when the slide is in inoperative position away from said ratchet sprocket member, whereby no power is transmitted from the shaft to the ratchet member when the shaft is rotated in either direction while the slide is so positioned.

13. A transmission for a power mower comprising a support, a propelling wheel therefor, a cutter connected to the support, a clutch, means for transmitting power to the clutch, a system for transmitting power from the clutch to the propelling wheel, a second system for transmitting power from the first system to the cutter, said second system including a one-way drive clutch oriented in the system to transmit power only when applied in the direction corresponding to forward motion of the mower, and means for completely disengaging the driving connection of the second system.

14. A transmission for a power mower comprising a support, a propelling wheel therefor, a cutter connected to the support, a clutch, means for transmitting power to the clutch, a system for transmitting power from the clutch to the propelling wheel, a second system for transmitting power from the first system to the cutter, said second system including a one-way drive ratchet mechanism, oriented in the system so as to drive said cutter in the cutting direction only, and means for releasing the ratchet to disable driving connection in both directions.

AMOS F. MOYER.